J. DECKER.
Balance Scales.
No. 94,292. Patented Aug. 31, 1869.
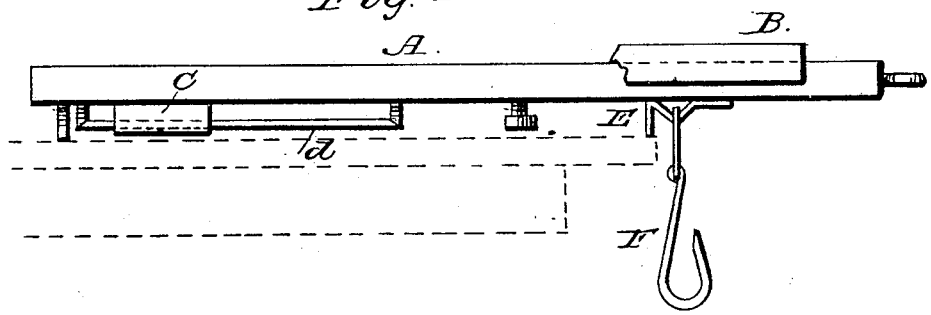
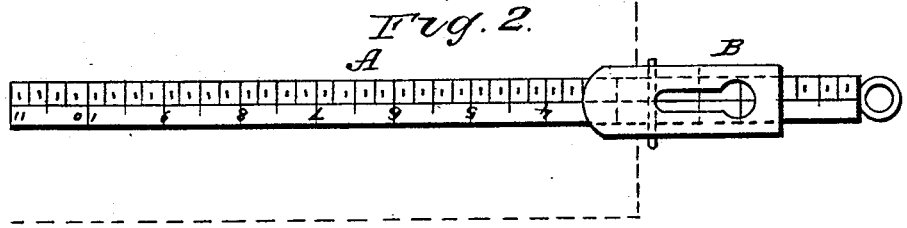
WITNESSES
Gustave Dietrich
O. Hinchman
INVENTOR
John Decker
per
Wm H.
attorney

United States Patent Office.

JOHN DECKER, OF SPARTA, ASSIGNOR TO HIMSELF AND E. DE CAMP, OF BOONTON, NEW JERSEY.

Letters Patent No. 94,292, dated August 31, 1869.

IMPROVEMENT IN COMBINED WEIGHING AND MEASURING-SCALE.

The Schedule referred to in these Letters Patent and making part of the same.

*To all whom it may concern:*

Be it known that I, JOHN DECKER, of Sparta, in the county of Sussex, and State of New Jersey, have invented a new and useful Improvement in Weighing-Scales; and I do hereby declare that the following is a full, clear, and exact description thereof, which will enable others skilled in the art to make and use the same, reference being had to the accompanying drawing, forming part of this specification.

This invention relates to a new and useful improvement in scales for weighing, more especially designed for domestic-use; and The invention consists in a balance-beam or bar, so marked or graduated that it serves as a measure, and so that each inch indicates one pound weight.

In the accompanying drawing—

Figure 1 represents a side view of the scale or balance as when in use on a table.

Figure 2 represents a top view of the same.

Similar letters of reference indicate corresponding parts.

A is the balance-beam.

B is the movable weight, by which the quantity weighed is indicated.

C is the balance, which is moved on the wire $d$.

E is the fulcrum or knife-edge, upon which the beam is balanced.

F is the hook, which supports the article to be weighed.

G is a headed screw, for supporting the weight B when the weight is not in use.

The table is seen in red color.

The top of the beam A is marked off into inches and fractions of an inch, each mark indicating a pound, or a fraction of a pound.

In scales for domestic-use, the beam A is made three feet in length, which serves for a yard-stick in the house, as well as a rule or standard of measurement for all purposes.

To use the scale, the fulcrum is placed on a table with the hook hanging over, as seen in the drawing.

The weight B is slipped forward over the one inch mark and to the end of the beam.

The balance C is moved to balance the beam on the fulcrum, when it is ready to weigh anything placed on the hook.

In moving the weight back on the bar, every inch will indicate a pound, and fractions of inches will indicate fractions of pounds.

An empty pail, or other vessel, may be balanced in the manner described, with the weight B at the end of the beam, when the process of weighing proceeds as before.

The advantages of this arrangement are many, and must be obvious to all.

Having thus described my invention,

What I claim as new, and desire to secure by Letters Patent, is—

The beam A, weight B, balance C, fulcrum E, and hook F, arranged and combined substantially as described, for the purpose set forth.

JOHN DECKER.

Witnesses:
HIRAM M. SAND,
R. K. ADAMS.